United States Patent
Penland (10) Patent No.: US 10,332,326 B2
(45) Date of Patent: *Jun. 25, 2019

(54) SECURITY SYSTEM FOR IDENTIFYING DISTURBANCES IN A BUILDING

(71) Applicant: Rustin B. Penland, Nederland, TX (US)

(72) Inventor: Rustin B. Penland, Nederland, TX (US)

(*) Notice: Subject to any disclaimer, the term of this patent is extended or adjusted under 35 U.S.C. 154(b) by 247 days.

This patent is subject to a terminal disclaimer.

(21) Appl. No.: 15/164,077

(22) Filed: May 25, 2016

(65) Prior Publication Data
US 2016/0358393 A1 Dec. 8, 2016

Related U.S. Application Data

(60) Provisional application No. 62/171,949, filed on Jun. 5, 2015.

(51) Int. Cl.
*G08B 13/00* (2006.01)
*H04N 7/18* (2006.01)
(Continued)

(52) U.S. Cl.
CPC ... *G07C 9/00166* (2013.01); *G08B 13/19652* (2013.01); *G08B 13/19695* (2013.01);
(Continued)

(58) Field of Classification Search
CPC ..... G08B 15/00; H04N 7/188; G07C 9/00126
See application file for complete search history.

(56) References Cited

U.S. PATENT DOCUMENTS 4,768,021 A 8/1988 Ferraro
5,111,755 A * 5/1992 Rouse .................. A47B 81/005
109/25
(Continued)

FOREIGN PATENT DOCUMENTS

CN 201924745 U 8/2011

OTHER PUBLICATIONS

14-104944 NPL Search Results (Year: 2018).*
(Continued)

*Primary Examiner* — Luis Perez-Fuentes
(74) *Attorney, Agent, or Firm* — Winston & Strawn LLP (57) ABSTRACT

A security system that includes a camera, a monitor, and a storage compartment for a defensive instrument installed in a room in a building. The storage compartment is associated with a camera that can record video and audio of occurrences or happenings in the room. The storage compartment is configured to communicate with a mobile device via a communications protocol and is electronically associated with at least two activation mechanisms: one that is activated for non-emergency situations, and another that is active for emergency situations. In both cases, the camera is direct to record video and audio of the situation, but in the emergency situation, the camera transmits the video and audio to other parts of the building to provide individuals located therein with real time information regarding the emergency situation. The second activation mechanism further provides access to a defensive instrument that is located in the storage compartment.

22 Claims, 7 Drawing Sheets

(51) Int. Cl.
  *G07C 9/00* (2006.01)
  *G08B 13/196* (2006.01)
  *G08B 25/10* (2006.01)
  *G08B 15/00* (2006.01)
  *G08B 13/16* (2006.01)
  *G08B 25/01* (2006.01)

(52) U.S. Cl.
  CPC ............ *G08B 15/00* (2013.01); *G08B 25/10* (2013.01); *H04N 7/188* (2013.01); *G08B 13/1672* (2013.01); *G08B 13/19645* (2013.01); *G08B 13/19697* (2013.01); *G08B 15/007* (2013.01); *G08B 25/016* (2013.01)

(56) References Cited

U.S. PATENT DOCUMENTS

| | | | |
|---|---|---|---|
| 5,168,994 A | 12/1992 | Beletsky et al. | |
| 5,416,472 A | 5/1995 | Torii, Jr. | |
| 5,416,826 A | 5/1995 | Butler | |
| 5,598,151 A | 1/1997 | Torii, Jr. | |
| 6,363,760 B1 | 4/2002 | Sigmond | |
| 6,791,451 B1* | 9/2004 | Muise | G08B 25/10 340/10.1 |
| 6,823,621 B2 | 11/2004 | Goffried | |
| 6,853,302 B2* | 2/2005 | Monroe | G08B 21/0269 340/5.8 |
| 6,965,541 B2* | 11/2005 | Lapin | G01S 3/8003 367/118 |
| 6,970,183 B1* | 11/2005 | Monroe | G08B 7/062 348/143 |
| 7,116,224 B2* | 10/2006 | Mickler | F41C 33/06 340/568.1 |
| 7,277,018 B2 | 10/2007 | Reyes et al. | |
| 7,336,169 B2* | 2/2008 | Coonce | G08B 7/062 340/506 |
| 7,468,663 B1 | 12/2008 | Rufolo et al. | |
| 7,656,286 B2 | 2/2010 | Benson et al. | |
| 7,714,720 B2 | 5/2010 | Hietanen et al. | |
| 7,986,231 B1 | 7/2011 | Bentley et al. | |
| 8,305,211 B1* | 11/2012 | Morris | G08B 13/19656 340/5.51 |
| 8,427,297 B1* | 4/2013 | Markey | G08B 7/06 340/3.1 |
| 8,520,674 B2 | 8/2013 | Samuels | |
| 8,749,343 B2 | 6/2014 | Cirker | |
| 8,770,116 B2 | 7/2014 | Heim et al. | |
| 8,922,335 B2* | 12/2014 | Deweese | H04N 7/188 109/38 |
| 9,111,430 B2* | 8/2015 | Kraus | G08B 25/005 |
| 9,251,695 B2* | 2/2016 | McNutt | G08B 19/005 |
| 9,316,039 B2* | 4/2016 | Stevenson | E05G 1/04 |
| 9,658,012 B2* | 5/2017 | Stewart | F41A 17/063 |
| 9,658,013 B2* | 5/2017 | Stewart | F41A 17/063 |
| 9,719,286 B2* | 8/2017 | Wall | E05G 1/10 |
| 2008/0061991 A1 | 3/2008 | Urban et al. | |
| 2011/0175730 A1* | 7/2011 | Stevenson | E05B 47/00 340/540 |
| 2011/0247950 A1 | 10/2011 | McGee | |
| 2013/0298807 A1 | 11/2013 | Wall et al. | |
| 2013/0326595 A1 | 12/2013 | Myers et al. | |
| 2015/0170486 A1* | 6/2015 | Penland | G07C 9/00126 348/152 |
| 2016/0358393 A1* | 12/2016 | Penland | G08B 15/00 |

OTHER PUBLICATIONS 14-104944 Patent Search Results (Year: 2018).*
International Search Report and Written Opinion, Appl. No. PCT/US2014/066388, dated Feb. 27, 2015.
U.S. Appl. No. 14/104,944, Non-Final Rejection, dated Mar. 26, 2014.
U.S. Appl. No. 14/104,944, Final Rejection, dated Aug. 1, 2014.
U.S. Appl. No. 14/104,944, Advisory Action, dated Nov. 5, 2014.
U.S. Appl. No. 14/104,944, Advisory Action, dated Nov. 18, 2014.
U.S. Appl. No. 14/104,944, Non-Final Rejection, dated Jan. 9, 2015.
U.S. Appl. No. 14/104,944, Final Rejection, dated May 11, 2015.
U.S. Appl. No. 14/104,944, Advisory Action, dated Jun. 17, 2015.
U.S. Appl. No. 14/104,944, Examiner's Answer to Appeal Brief, dated Apr. 22, 2016.

* cited by examiner

SECURITY SYSTEM FOR IDENTIFYING DISTURBANCES IN A BUILDING

This application claims the benefit of U.S. provisional application 62/171,949 filed Jun. 5, 2015, the entire content of which is expressly incorporated herein by reference thereto.

FIELD OF THE INVENTION

The present invention relates to a security system and, more particularly, to a security system capable of recording and transmitting video and audio of a disturbance or emergency situation in a room in a building to nearby rooms to provide occupants of those rooms information regarding the situation to allow them to take appropriate action.

BACKGROUND OF THE INVENTION

School shootings have always been a major concern in this country and numerous measures have been adopted to reduce their occurrences and harm. Legislations have been enacted to restrict access to firearms and security systems have been installed to record emergency situations and notify safety authorities. Given the increased number of shootings and death toll in the recent years, however, it appears that these measures are inadequate. Individuals can still purchase a gun from the black market or steal it from a legal owner, and current security systems are not capable of providing live information of an emergency situation directly to those nearby so that they can evacuate promptly and safely.

For example, U.S. Pat. No. 8,305,211 to Morris et al. ("Morris") discloses a surveillance system comprising a security installation having video cameras and door locks securing an institutional building and a peer interface connected to a plurality of peer installations, each of which is connected to a corresponding aid provider such as a police station, fire department, or hospital. Upon determination of an exigent situation, the peer interface of the security installation selects the proper peer installation that allows the corresponding aid provider to watch the live exigent situation and provide assistance, such as making announcements for directing existing crowds away from the exigent situation or locking doors to prevent perpetrators from causing harm. As such, this system is deficient in that it requires awaiting safety instructions from the aid provider as the crowds do not have firsthand information of the exigent situation and they would not be able to execute self-help or take actions they deem appropriate. Moreover, broadcasting safety instructions in the place where both the assailant and the crowds are located is not practical as the assailant may follow the instructions to the area where the crowds congregate or exit to cause more harm.

In another example, U.S. Pat. No. 7,116,224 to Mickler ("Mickler") discloses an alarm ready portable case for securing a firearm that may be utilized in conjunction with a pre-existing security system. With authorized access, a person can remove the gun in the case and use it as a defensive weapon. If unauthorized access is determined, the case would sound an alarm. Mickler, like Morris, does not have the ability to provide firsthand information of an exigent situation. U.S. Pat. No. 5,416,272 to Torii ("Torii") discloses a similar firearm case but lacks the same ability.

In yet another example, U.S. Pat. No. 6,965,541 to Lapin et al. ("Lapin") discloses a gunshot digital imaging system comprising an acoustic sensor for detecting a gun shot or explosion and a camera for recording images of the area of the gun shot or explosion. When a gun shot or explosion is detected by the acoustic sensor, the camera is slew toward the area of the gun shot or explosion to record images of that area. While this system can record images of an emergency situation, it is not designed to transmit the recorded emergency images to those nearby to provide live information of the situation. In addition, this system cannot be used to record an emergency situation that does not involve either a gun shot or explosion.

Accordingly, there remains a need for an improved security system that overcomes the deficiencies of the prior art and that provides real time advanced warnings to individuals located nearby an emergency situation.

SUMMARY OF THE INVENTION

The invention now provides a security system for identifying a disturbance in a room of a building. This system comprises a camera and monitor in a number of rooms of the building that is accessible to individuals, with the camera being positioned and located to record and transmit viewing of a substantial portion or all of the room when the camera is activated. The camera is able to record both sights and sounds occurring in the room while each monitor is engageable to receive transmissions from one or more cameras of other rooms. The system includes a storage compartment for a weapon located in at least one of the rooms. The storage compartment configured to communicate with a mobile device via a communications protocol and is electronically associated with at least two activation mechanisms, a first one associated with activation of the system for a non-emergency situation and a second one associated with activation of the system for an emergency situation.

With the communication, the storage compartment may detect the mobile device and tracts movement of the mobile device within the range of the communications protocol.

The first activation mechanism is designed, positioned and configured to activate the camera in a room experiencing a non-emergency disturbance so that events occurring in the room during the disturbance can be recorded and to notify the building and user of the mobile device the non-emergency disturbance, while the second activation mechanism is designed, positioned and configured to, sequentially or simultaneously, activate the camera, open the storage compartment to provide access to the weapon therein and generate an alarm that indicates that an emergency situation exists in the room to the building and to the user of the mobile device, with the camera allowing video and audio of the events in the room to be simultaneously recorded and transmitted to the monitors of at least adjacent or nearby rooms to provide occupants of those rooms information regarding the emergency situation and to the user of the mobile device to provide the user information regarding the emergency situation. Advantageously, each room of the building includes a camera, monitor, storage compartment and first and second activation mechanisms.

The first and second activation mechanisms are generally mounted on the storage compartment for convenience. In an alternative embodiment, one of the first and second activation mechanisms, or both, may be mounted on a wireless remote. A convenient second activation mechanism may be a button, keypad, finger print sensor, smart card sensor or acoustic sensor in order to provide easy access to the storage compartment to quickly retrieve the weapon from it when necessary. The weapon is typically a handgun, stun gun, club or bat, tear gas or pepper spray. The acoustic sensor can be used to detect a gunshot, an explosion, a breaking window, or noise having a certain decibel level or frequency as this would indicate an emergency situation in the room. Also, a smoke or fire sensor may be associated with the storage compartment to independently monitor those situations and provide an alarm as necessary.

In operation, it is anticipated that access to the second activation mechanism is provided after the first activation mechanism is activated. This allows a person in the room, typically an authorized person such as a school teacher, to record events that start as a distraction or disturbance before escalating to an emergency situation. To assist in communicating the status of the situation in the room, the storage compartment may be provided with comprises communication capabilities that are typically located in or near the storage compartment and that are accessible after the first activation mechanism is activated.

It is preferred for the system to include additional cameras located in hallways, stairs, elevators, or doors providing access to the building to view those areas and transmit video and audio of activities thereby as further information to the individuals that are located near the disturbance or emergency situation. When an intruder is present or the situation escalates to areas outside of the room, these cameras can observe movement through the building. Typically, the additional cameras are activated when the second activation mechanism is activated. The additional cameras are preferably provided on a monitor that displays video and audio of the events occurring in the room where the disturbance is located and that includes a microphone for recording sounds near the monitor. The video and audio of the camera in the room in which the emergency situation exists and the video and audio of the additional cameras or monitors in the hallways, stairs, elevators, or doors providing access to the building all can be transmitted to a security office to provide information of the situation and movement of the intruder or individuals through the building. The security office may be a principal's office, a school security office or a police station or other remote security service.

The second activation mechanism also is designed to transmit information to lock down doors, stairwells or elevators nearby the room in which the emergency situation exits or in a section of the building nearby the room in which the emergency situation exits in an attempt to contain the emergency situation to the room or adjacent locations. This can be prevent an intruder from gaining access to other areas of the building and can help isolate the intruder to facilitate containment or capture by security personnel.

The storage compartment may be further configured to communicate with a registered mobile device. The registered mobile device may be registered with the system via an application installed on the mobile device or a website associated with the system. The communications protocol linking the storage compartment and the mobile device may be WiFi, Bluetooth, 802.11, Bluetooth, radio frequency systems such as 900 MHz, 1.4 GHz, and 5.6 GHz communication systems, infrared, GSM, GSM plus EDGE, CDMA, quadband, and/or any other suitable protocol.

BRIEF DESCRIPTION OF THE DRAWINGS

FIGS. 2(a), 2(b) and 2(c) illustrate a storage compartment for a defensive instrument for use in the present system, wherein

DETAILED DESCRIPTION OF THE INVENTION

In the following detailed description, the installation and operation of the systems and methods of the invention are illustrated in a school building, but it is understood that such systems and methods are equally applicable for use in other buildings for example hospitals, movie theaters, shopping centers or shopping malls, office buildings, etc. including any structure that includes multiple rooms or gathering areas where people in one area can be notified of disturbances in other areas that are not immediately visible to the people.

Figure 1:
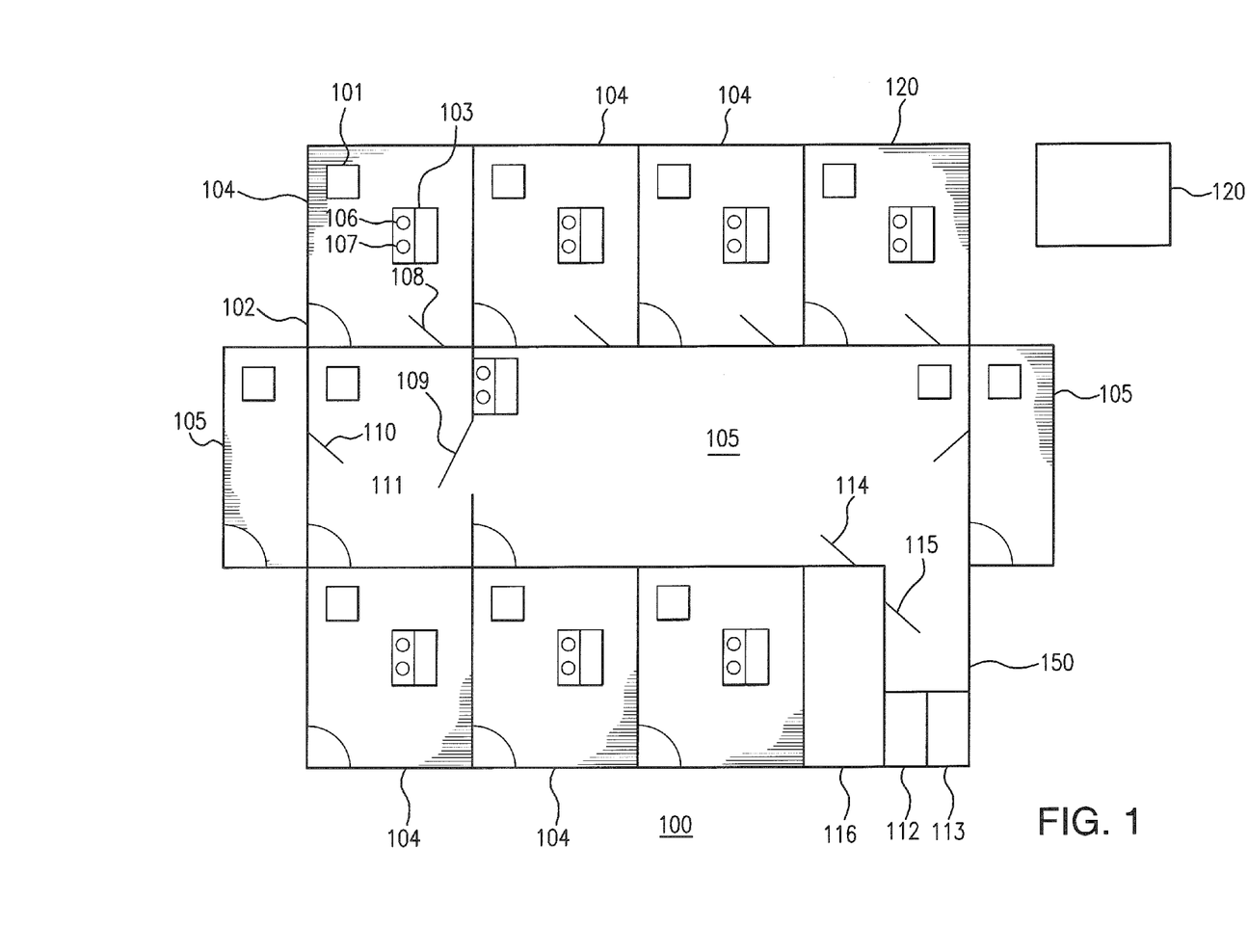
FIG. 1 is a schematic of a building floor plan that illustrates one embodiment of the security system of the invention.

Referring to FIG. 1, one embodiment of the security system 100 for identifying a disturbance in a building 150 is illustrated. Security system 100 comprises a camera 101 and monitor 102 installed in each room 104 and a storage compartment for a defensive instrument 103 installed in at least one or more of adjacent rooms 104 as well as in common area 105.

The camera 101 is typically a digital camera that is capable of recording both sights and sound. It is located and positioned so that the sights and sounds in a substantial portion or all portion of the room in which it is installed can be recorded when it is activated. The disturbance in a school setting, for example, could be an unruly student or a fight between students that occurs in a classroom. When activated by the teacher, the camera will record the incident for possible future review to determine which students were unruly and deserving of discipline. In that type situation, the camera does not transmit the recording but simply maintains it for future use. The camera can include internal storage but it is more secure to have the camera transfer the collected images and sounds to a storage location.

The monitor 102 in the same room is operatively associated with each camera 101 of other rooms to receive video and audio transmissions from one or more cameras 101 of other rooms. The monitor 102 may be associated to each camera 101 of other rooms through wired or wireless connections. It is envisioned that the monitors are not activated unless an emergency situation is present, and this is to provide people in adjacent or nearby rooms with real time information regarding the emergency situation so that they can react appropriately. In some cases, the actions may be to move away from the situation to a more safe or secure location, or when a monitor in a security office is activated, to will inform security personnel of exactly where to contain our counter the situation. The cameras mounted in hallways and directed at entry and exit passages, including the grounds around the building, can provide information of movement or travel of intruders or persons fleeing the emergency situation to help direct and control such movement or travel.

The storage compartment 103 stores a defensive instrument which may be accessed and used by an authorized person such as a teacher. To prevent unauthorized engagement or of the system or access to storage compartment, at least two activation mechanisms 106, 107 are provided. The storage compartment 103 may be remotely associated or physically associated with the least two activation mechanisms 106, 107. When remotely associated, the at least two activation mechanisms 106, 107 may be mounted at a location remote from the storage compartment 103 and be connected to the storage compartment 103 through a wired or wireless network. The at least two activation mechanisms 106, 107 may also be mounted on a wireless remote control for use in each room 104. When physically associated, the at least two activation mechanisms 106, 107 may be mounted directly on the storage compartment 103.

The at least two activation mechanisms 106, 107 may be installed in more than one room or all of the rooms 204 and be associated with the storage compartment 103 in the manner described herein. Engagement of the system would typically be made by an authorized person and for that a security code would be provided to prevent inadvertent or unauthorized engagement. While this is not entirely necessary for the first activation mechanism, it would almost often be required for the second activation mechanism. Otherwise, anyone would be able to access the storage compartment to withdrawn the weapon from it. Weapons such as handguns, stun guns, tear gas or pepper spray are capable of causing harm and the security code would provide additional protection from unauthorized access to such weapons.

One of the at least two activation mechanisms 106, 107 in the room, or in the multiple rooms if more activation mechanisms are installed, is associated with non-emergency situations and is used only to activate the camera in the same room to record video and audio in the room. As noted, this activation mechanism would not transmit the recorded video and audio to the monitors 102 in other rooms. The other one of the at least two activation mechanisms 106, 107 may be associated with an emergency situation and be used to activate the camera in the same room to record video and audio in that room and to transmit the recorded video and audio to the monitors 102 in other rooms and to a security office 120.

The other one of the at least two activation mechanisms 106, 107 may also be used to close and lock doors 108, 109, 110 and to lock elevators 112, 113 in the common area 105 so that the assailant, or the emergency situation, may be prevented from entering, or spreading to, other parts of the building 150 or be contained in a location. For example, if a shooting were to occur in the room 104, the assailant may be locked in that room by closing and locking door 108. If the assailant has already left that room and is in location 111 in the process of seeking other victims in other rooms or in common areas, all three doors 108, 109, 110 may be closed and locked in an attempt to contain the assailant until the emergency responders arrive. The elevators 112, 113 and the doors 114, 115 of the stairwell 116 may be similarly closed and locked if the assailant, or the emergency situation, was in or moving towards those areas.

The second activation mechanism 106, 107 may further be used to open the storage compartment 103 to provide access to the defensive instrument so that the individual can use that instrument to protect himself, herself, or the crowd in an emergency situation. The defensive instrument may simply be a club or bat, instead of the more powerful handgun, stun gun, tear gas, or pepper spray weapons. Also contemplated as a weapon would be other protective instruments such as a fire extinguisher, gas mask, or other instrument used to combat an emergency situation depending on the use of the building and the type of emergency situation that could be encountered.

The building 150 to be protected in a preferred embodiment of the invention is a school or university, but the system can also be used in an office building, movie theater, hospital, or any other public place having rooms or section where people congregate. The room 104 may be a classroom or office. The common area 105 may be a hallway, stairwell, elevator, pantry, cafeteria, entrance, entrance, exit, or any area that is available for use by more than one person. In this embodiment, the building 150 is a school, the room 104 is a classroom, the common areas 105 are a hallway, stairwell, and entrance/exit, and the security office 120 includes a principal's office, school security office, and police station.

The security system 150 may further comprise additional storage compartments 103 with one preferably installed in each room 104 and optionally in the common area 105 so that each room 104 and the common area 105 has a defensive instrument available to counter an emergency if the emergency happens in that room 104 or common area 105. Additional cameras 101 and monitors 102 may also be installed in the common area 105 so that each common area 105 can record, transmit, and receive video and audio of an emergency situation like room 104.

Figure 2A:
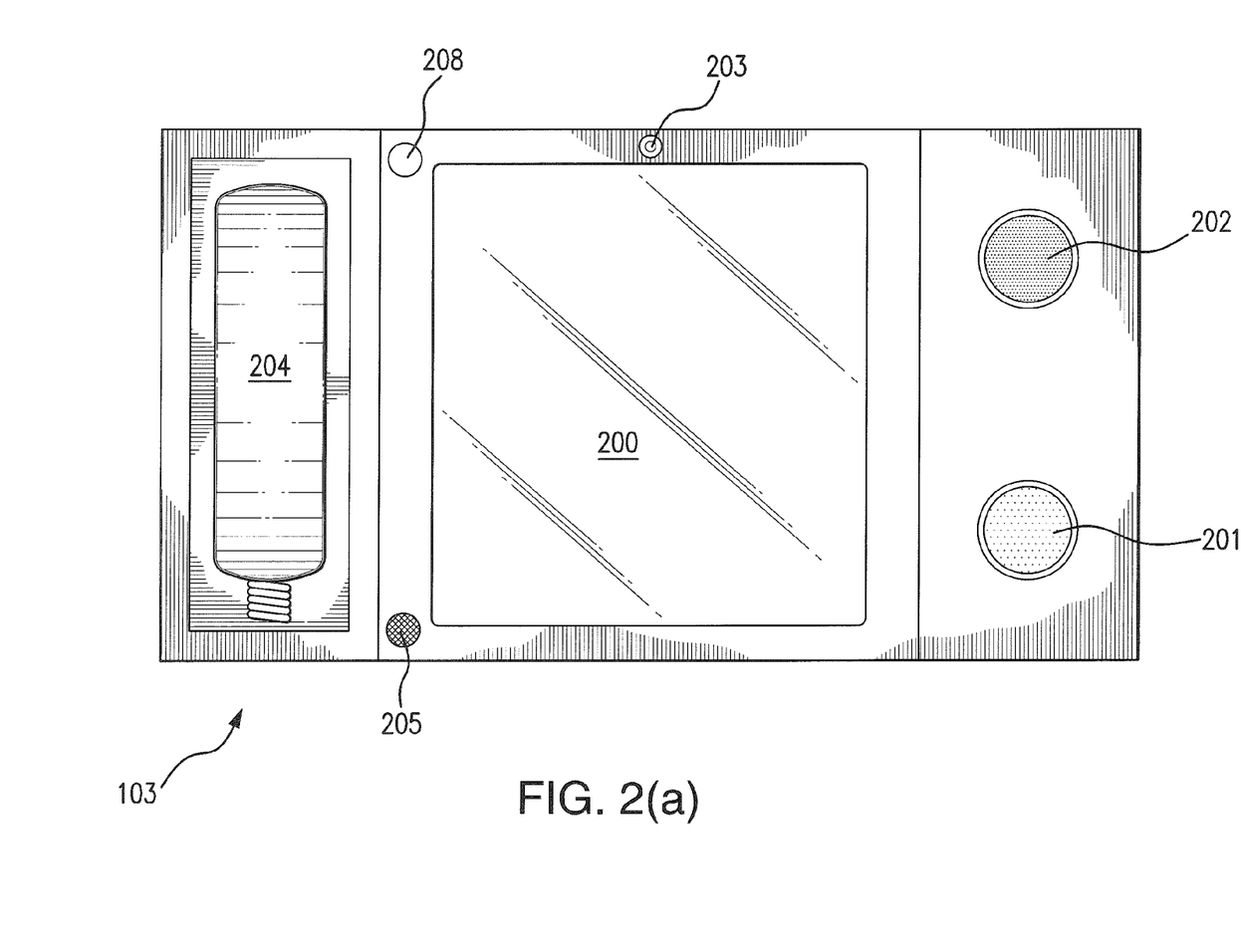
FIGS. 2(a) and 2(b) illustrate exterior portions of the storage compartment and FIG. 2(c) illustrates the interior portion of the storage compartment.
Figure 2B:
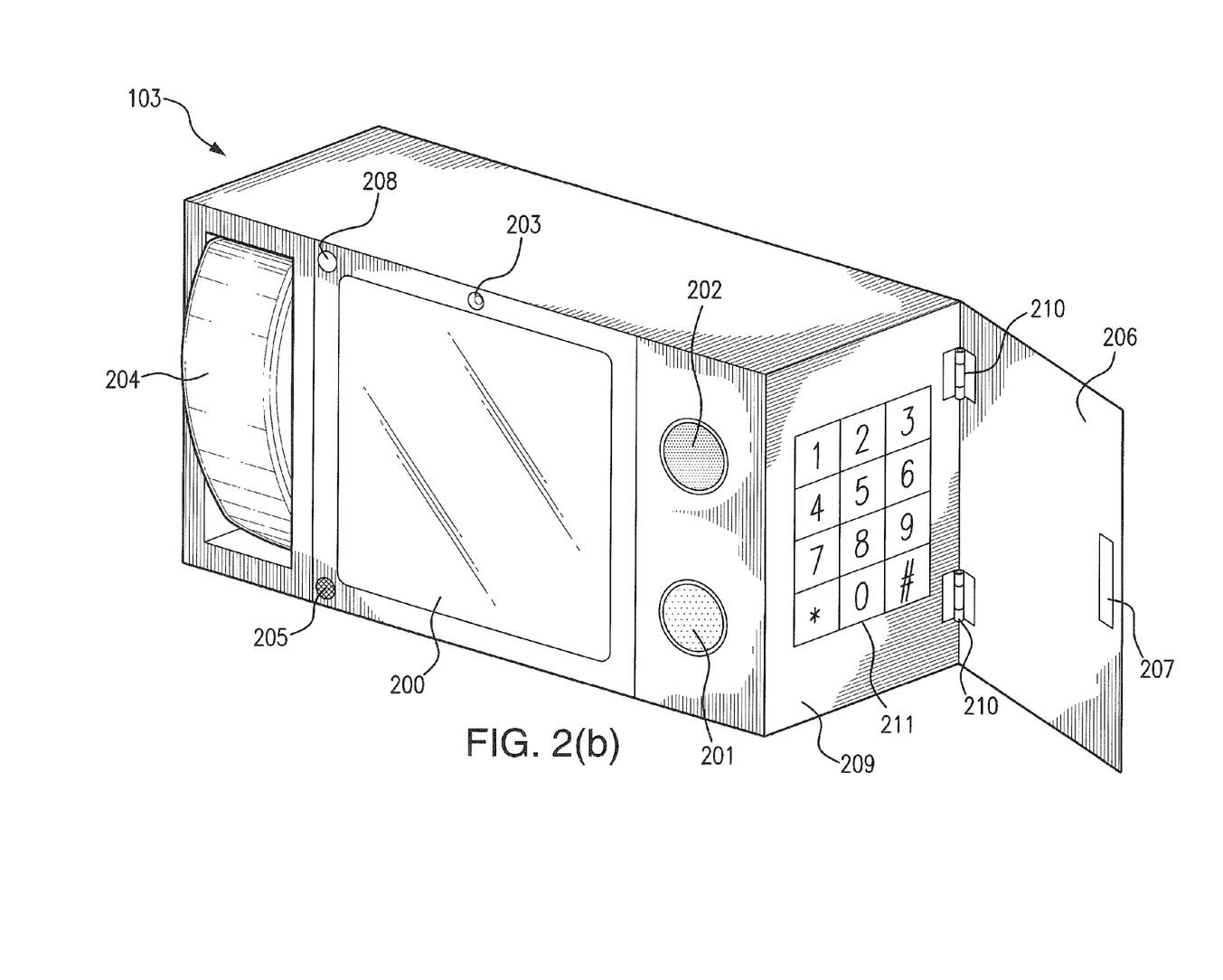
Figure 2C:
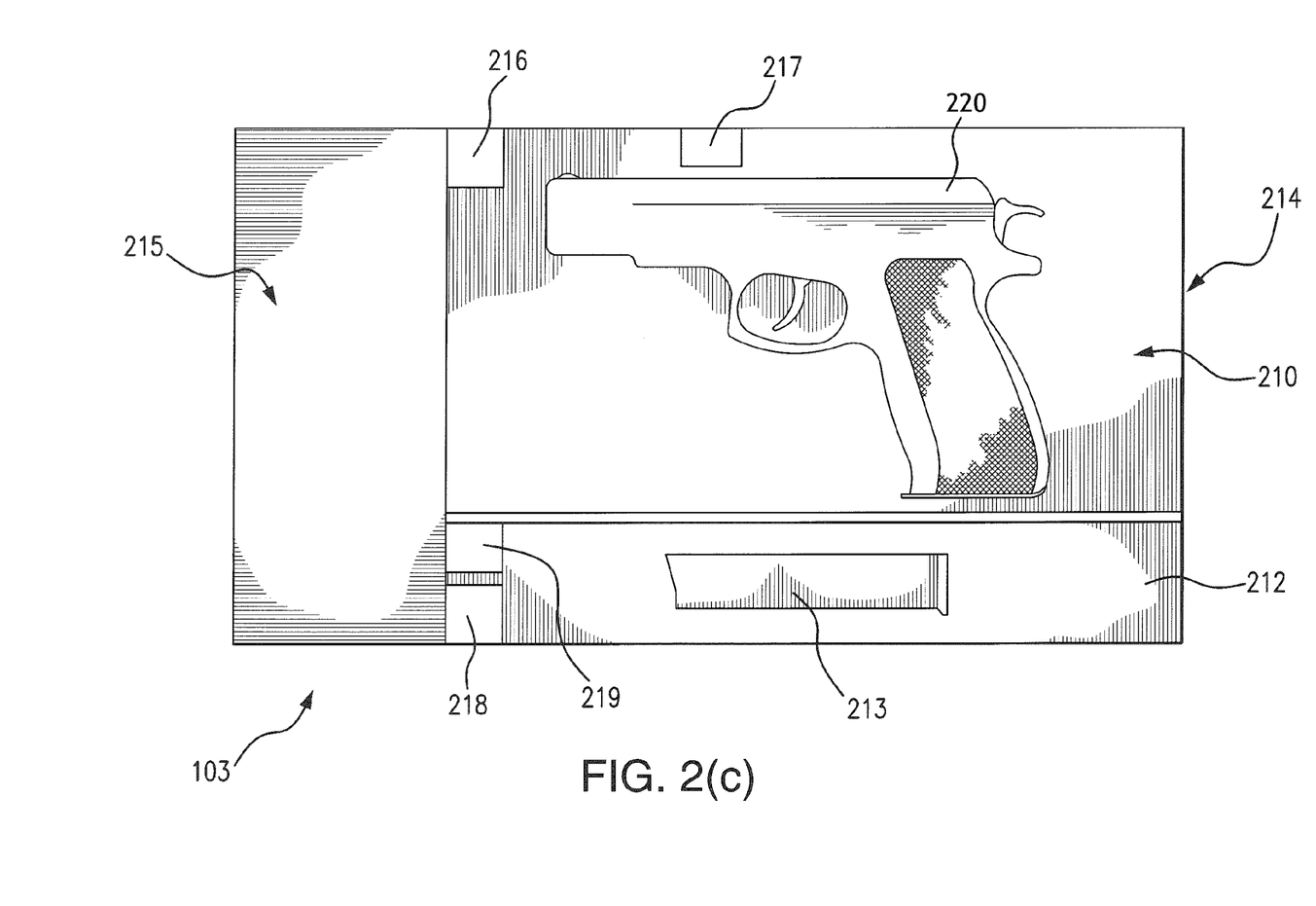

Referring to FIG. 2, one embodiment of the storage compartment for a defensive instrument 103 is illustrated. FIGS. 2(*a*) and 2(*b*) illustrates the exterior of the storage compartment 103 and FIG. 2(*c*) illustrates the interior of the storage compartment 103.

In reference to FIGS. 2(*a*) and 2(*b*), the exterior of the storage compartment 103 on one side may comprise a screen 200, a first activation mechanism 201, a second activation mechanism 202, a camera 203, a handset 204, and a microphone 205. For smoke detection, an ionization and photoelectric sensor 208 is provided. The first and second activation mechanisms 201 and 202 correspond to the at least two activation mechanisms 106, 107 in FIG. 1. FIG. 2(*b*) illustrates that the side of the compartment 103 comprises a first door 206, a first door lock mechanism 207, and a second door 209 to safely store and provide access to the defensive instrument in the storage compartment 103. Safety hinges 221 are provided to make it difficult for an unauthorized person to remove the first door 206.

The screen 200 may display the room number of the room or the name of the common area that is experiencing a non-emergency or emergency situation when the first or second activation mechanisms in a room is activated. The screen 200 may also display such information through a layout of the floor or the building that points to which room or common area is experiencing the non-emergency or emergency situation.

The camera 203 and microphone 205 are provided to also record video and audio of the non-emergency or emergency situation. They may be used to supplement the camera 101 in the same room or in the same common area to record from a different angle since the storage compartment 103 may be placed at a location different from the camera 101. They may be triggered similarly like the camera 101 by the first and second activation mechanisms 201, 202 depending on whether the situation is non-emergency or emergency.

When the camera 203 and microphone 205 are triggered in a non-emergency situation by activating the first activation mechanism 201, they, along with the camera 101, record the video and audio of the non-emergency situation. The recorded video and audio are available for later retrieval but are not transmitted to other rooms, common areas, or a security office for viewing. This is because those in other rooms do not necessarily need to know what is happening in that room or to evacuate, and the recording in this situation is mainly for evidence collection to help understand the situation in a subsequent investigation. For example, when an imminent fight is about break out between two students, the teacher may record this event to know who provoked the fight, who threw the first punch, and who assisted in the fight, etc.

On the other hand, when the camera 203 and microphone 205 are triggered in an emergency situation by activating the second activation mechanism 202, they, along with the camera 101, not only record the video and audio of the emergency situation but also transmit the recorded video and audio to other monitors 102 in other rooms and in the common areas and to the security office 120. In this way, those nearby the emergency situation may escape or take the appropriate actions and the security personal can provide aid based on the information transmitted. A multi-angle viewing of a non-emergency and emergency situation help eliminate blind spots and reveal obstructed areas during recording.

The handset 204 provides communication capability to the security office. The communication capability may be accessible after either the first or second activation mechanism 201, 202 is activated. For example, the handset 204 may be configured to provide communication capability to the principal's office or school security office after the first activation mechanism 201 is activated and to the police station after the second activation mechanism 202 is activated. The communication capability to the police station may or may not be required to first activate the first activation mechanism 201. The communication capability may also be accessible even when neither the first or second activation mechanism 201, 202 is activated. The handset 204 may be configured by default to provide communication capability to the principal's office or school security office when neither the first or second activation mechanism is activated. The difference between utilizing the handset 204 with the first activation mechanism 201 activated and utilizing the handset 204 without the first activation mechanism activated 201 is that the latter does not provide recording by the camera 101, camera 203, and microphone 205. The handset 204 may also provide communication capability to other rooms 104 and common area 105 without activating neither activation mechanism or with activating one of the activations mechanisms.

Since the first and second activation mechanisms 201, 202 are the at least two activation mechanisms 106, 107 in FIG. 1, they have all the functions described earlier. In addition, they can activate visual alerts on all the screens 200 of all the storage compartments 103 and sirens, if equipped, on all the storage compartments 103. Each of the activation mechanisms 201, 202 can also send an alert to the corresponding security office and notify security personnel the situation. The second activation mechanism 202 may further open the first door 206 to provide access to the second door lock mechanism 211 that can be unlocked to obtain the defensive instrument. The first and second activation mechanisms 201, 201 may be buttons, keypads, finger print sensors, smart card sensors, acoustic sensors, or any combination thereof. The lock mechanism 211 may be a keypad, finger print sensor, smart card sensor, or any combination thereof. In this embodiment, the first and second activation mechanisms 201, 202 are buttons and the lock mechanism 211 is a keypad. When one or both of the first and second activation mechanisms 201, 202 are acoustics sensors, they may detect a gun shot, an explosion, a breaking window, or noise having a certain decibel level or frequency. Since the second activation mechanism 202 is associated with a more serious situation, it may be desired to render the second activation mechanism 202 inoperable until the first activation mechanism 201 is activated. They, however, may also be equally accessible without any restriction.

A shown in FIGS. 2(a) and 2(b), the storage compartment includes a smoke detector sensor 208 which is able to detect a smoke situation and when so detected send a fire alarm to inform the building occupants of the need to evacuate. The sensor 208 can also send a message to the local fire department of the smoke or fire situation so that an appropriate response can be made to address the situation. This sensor 208 can be of the type that also detects excessive heat to indicate that a fire situation may be present.

In reference to FIG. 2(c), one embodiment of the interior of the storage compartment 103 is illustrated. The interior may comprise a first section 210 for storing a defensive instrument 220, shown in this figure as a handgun, a second section 212 for storing a magazine 213 or other related peripheral items, and a third section 215 for storing the electronic components of the handset 204. Also provided are sections for storing or accommodating the electronics for the other features of the compartment 103. Section 216 provides storage for the electronics of the sensor 208, section 217 provides storage for the electronics of the camera 203, and section 218 provides storage for the electronics of the microphone 205. Section 219 provides storage for the electronics of the wired or wireless system that communicates with other storage compartments, main computers or outside protection agencies (i.e., police, fire, paramedics, etc.).

The first section 210 is situated with one of its sides adjacent to the door side 214 of the storage compartment 103. The door side 214 is the side that has the first door 206, the lock mechanism 207, and the second door 209. The second section 212 is situated below the first section 210 and with its one of sides also adjacent to the door side 214. These sections have one side adjacent to the door side 214 so that the defensive instrument 220 and magazine 213 can be obtained when the second door 209 is unlocked through the lock mechanism 207. The third section 215 is situated adjacent to the first and second sections 210, 212 and opposite to the door side 214. In another embodiment, the first and second sections 210, 212 may be combined to form one larger section to store a larger defensive instrument. In yet another embodiment, the storage compartment 103 may be large enough to house multiple first and second sections to store multiple defensive instruments and magazines.

Figure 3:
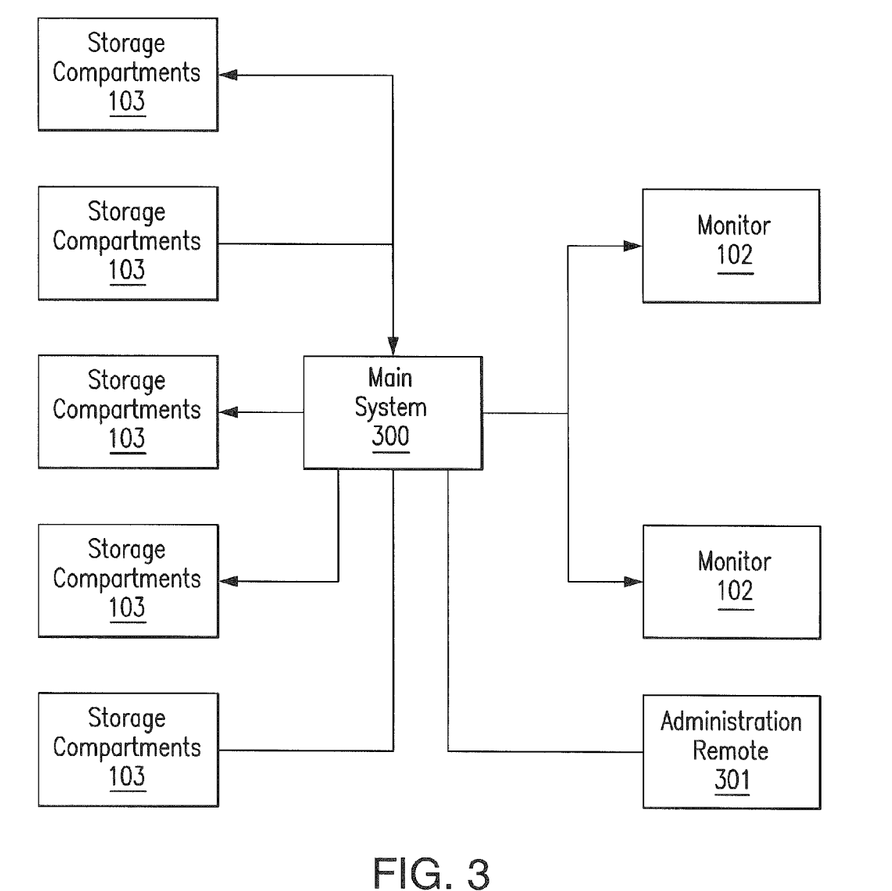
FIG. 3 is a schematic that illustrates the connections of the storage compartments to the security system of the invention and to the main system of the building.

Referring now to FIG. 3, the security system 150 may be optionally connected to a main system 300. The main system 300 may include a processor of computer that can change the settings and functions of the security system 150. Examples of such changes include the security offices the first and second activation mechanism should contact, the telephone numbers of the security offices that the handset 204 should dial or that are automatically dialed when the first or second activation mechanism 201, 202 is or is not activated, the recording of the cameras 101 and 203, the video and audio transmission by the monitors 102, the inoperation of the second activation mechanism 202 until the first activation mechanism is 201 is activated, the disarmament and armament of the security system 150 when either the first or second activation mechanism 201, 202 is activated, the keypad combination, siren override, the text of the visual alerts, the system log of all events, the routine automatic or manual security system 150 check, etc. These changes may be made directly on the main system 300 or through an administration remote 301 when the operator is away from the main system 300. When the security system 150 is not connected to a main system 300, these changes may be made individually on the cameras 101, the monitors 102, and the storage compartments 103.

Figure 4:
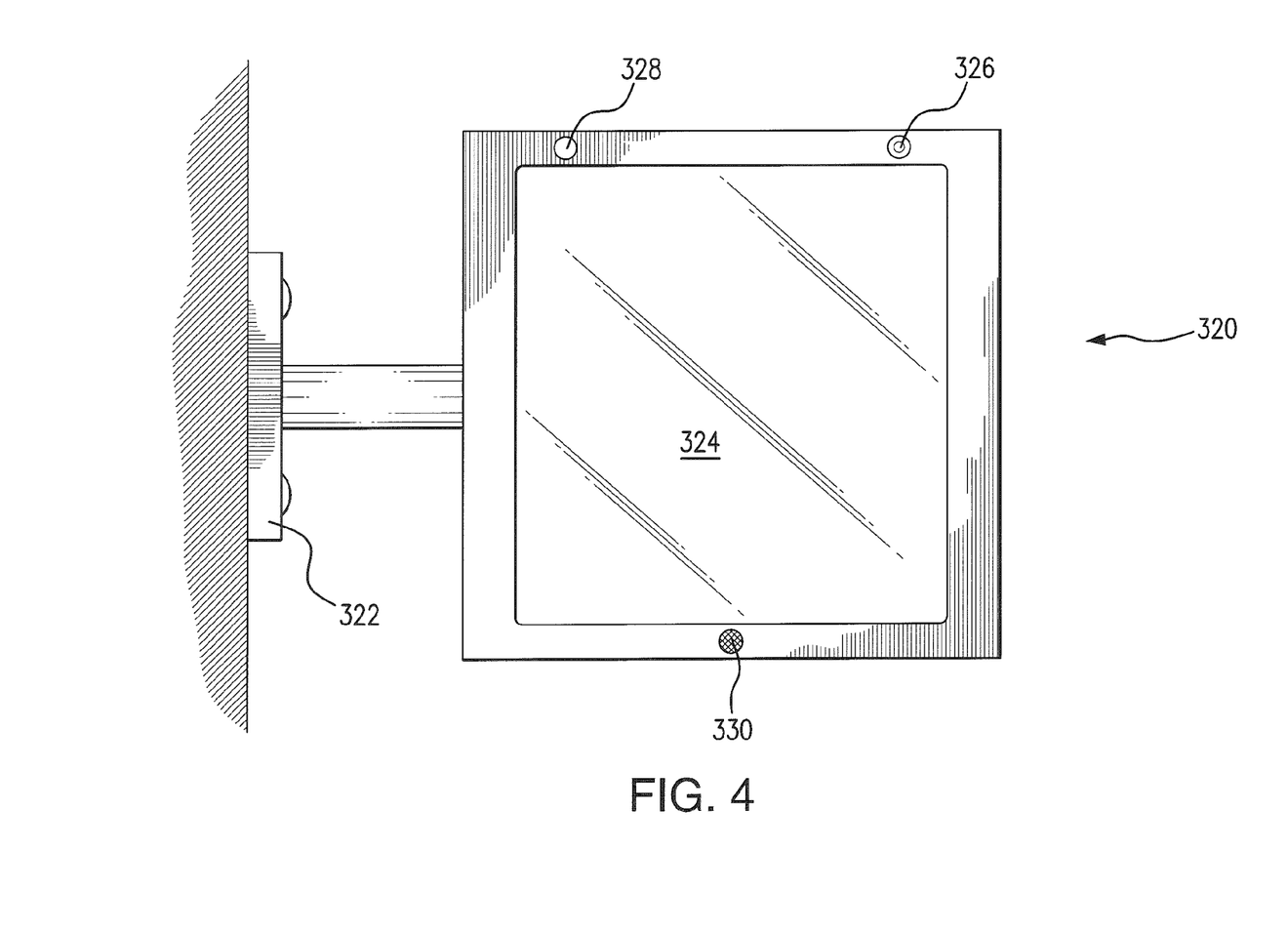
FIG. 4 illustrates a room or hall monitor for use with the security system of the invention.

FIG. 4 illustrates a room or hall monitor 320 which is activated when button 201 or 202 are activated. Monitor 320 is attached to the wall by a bracket 322 and includes a screen 324, a camera 326, a smoke and fire sensor 328, and a microphone 330. When an emergency situation is identified through activation of button 202 in one of the building rooms, the video and audio are transmitted to other monitors in other rooms and to the monitors 320 in the common areas and in the security office 120. The monitors 320 in common areas provide viewing of emergency situation as well as using camera 326 to record or transmit the situations occurring near the monitor. This can be used to monitor movement of unauthorized individuals or even to monitor the evacuation of individuals from the building. Microphone 330 can monitor nearby sounds. Sensor 328 can independently monitor smoke or fire situations and generate an alarm when necessary. In this way, those nearby the emergency situation obtain further information on which way to escape or take the appropriate actions and the security personal can provide aid based on the information transmitted. A multi-angle camera can provide the greatest viewing of the adjacent area but an appropriate selection of monitors can also be used in order to provide the greatest viewing with elimination of blind spots or obstructed areas during viewing or recording. As above, the camera and microphone information can be recorded and stored for future use in recreating the situation or learning how best to respond to similar situations in the future.

Figure 5:
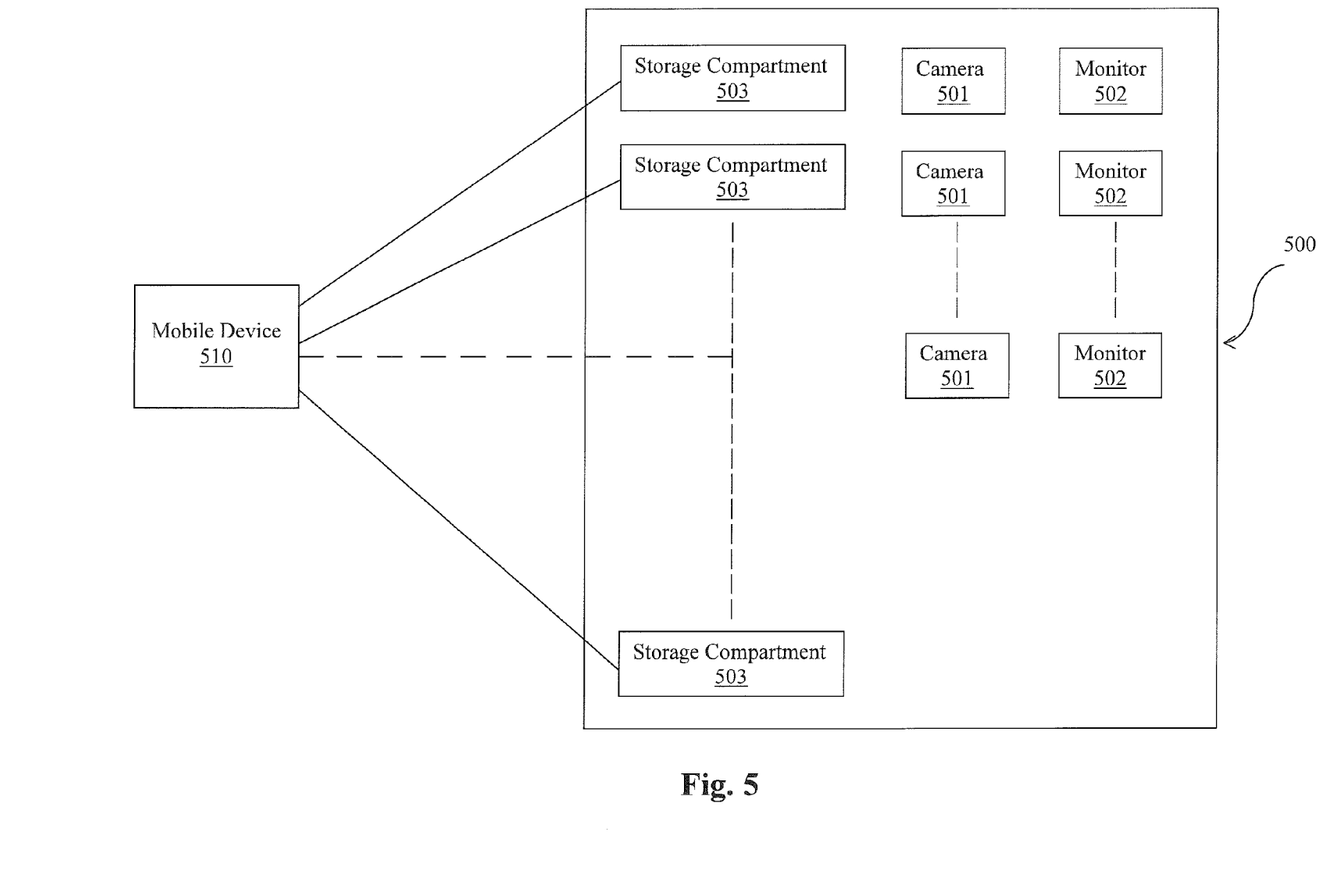
FIG. 5 illustrates storage compartments configured to communicate with a mobile device.

Referring to FIG. 5, another embodiment of the security system 500 for identifying a disturbance in a building is illustrated. In this embodiment, one or more, and preferably all, the storage compartments 503 of the security system 500 are configured to communicate with a mobile device 510 via a communications protocol 515. When one of the two manual activation mechanisms on one of the storage compartments 503 is activated, the disturbance notification and recording associated with that activation mechanism may be simultaneously transmitted to the mobile device 510 through the communications protocol 515 to alert the user of the mobile device 510 a situation in the building. For example, when an authorized individual activates the first activation mechanism on a storage compartment 503 to indicate a non-emergency disturbance, the notification of the non-emergency disturbance may be simultaneously transmitted to the mobile device 510 in addition to providing the notification to the building. When an authorized individual activates the second activation mechanism on a storage compartment 503 to indicate an emergency disturbance, the notification of the emergency disturbance and the recording of the emergency disturbance (which is simultaneously activated by the second activation mechanism) may be simultaneously transmitted to the mobile device 510 in addition to providing the notification to the building and transmitting the recording to other rooms of the building. Moreover, the activation of either activation mechanism may also disclose where the disturbance is occurring in the building, such as which room or common area, to the mobile device 503 through the communications protocol 515.

The mobile device 503 is worn by an individual, and the individual may be a teacher, a student, a parent, a janitor, a security, a police, an emergency medical responder, an authorized personnel, or any other individuals. With the above feature, the individual may receive the notification from the mobile device 503 if there is a disturbance in the building and determine if he or she should still go to the building if he or she has not yet arrived there. For example, the individual may stop by a convenience store before going to the building and receive a non-emergency disturbance notification. In this case, the individual knows that there is a disturbance in the building but he or she may still head to the building after shopping at the convenience store since the situation is not exigent. If the individual instead receives an emergency disturbance notification, the individual would know that he or she should no longer go to that building and that he or she should go to a different place to avoid harm. In either notification, the mobile device 503 may further disclose the location of the disturbance in the building if necessary to assist in identifying areas where the person should not go.

With the above feature, the individual may also receive the notification from the mobile device 503 if there is a disturbance in the building, know where the disturbance is occurring in the building from the mobile device 503, and determine where he or should go in the building if he or she is inside the building or where and which way to leave the building to avoid the disturbance. The mobile device 503 may also indicate where the nearest safe area is and provide directions to that area. The safe area may be any room, exit, or common area in the building where an assailant cannot cause harm to the individual. For example, if a student receives an emergency disturbance notification and knows where the disturbance is from the mobile device 503, the student may determine himself or herself which exit he or she wants to escape from or which room he or she should be hiding. The mobile device 503 may also indicate where the closest safe area is, such as the exit directly below the student, and provide the student directions to that exit. The mobile device 503 may also list all the safe areas and the student may decide where he or she wants to go. The safe area may be an area where security personnel are located or one that is not accessible by persons who are not authorized to be in the building.

Each of the storage compartments 503 and the mobile device 503 may have associated electronics, such as a processor, a non-volatile storage, a volatile memory, an encoder/decoder, an analog-digital converter (ADC), a digital-to-analog converter (DAC), a transceiver, and other necessary electronics, to communicate with each other over the communications protocol 515. During communication, each of the storage compartments 503 and the mobile device 510 may transmit data to each other, receive data from each other, and process the received data. Data may include disturbance notification, disturbance recording, disturbance location, and any other information mentioned in this application. The communications protocol 515 may be WiFi, Bluetooth, 802.11, Bluetooth, radio frequency systems such as 900 MHz, 1.4 GHz, and 5.6 GHz communication systems, infrared, GSM, GSM plus EDGE, CDMA, quadband, and/or any other suitable protocol. Since the communications protocol 515 links the storage compartments 503 and the mobile device 510 together, the communications protocol 515 may also help the mobile device 503 to locate all the storage compartments 503 in the building so that the user of the mobile device can quickly retrieve a defensive instrument from the nearest storage compartment 503. This feature is particularly useful when the user of the mobile device or the authorized personnel is an outsider who is not familiar with the layout of the building or with the security system 500 or when the storage compartments 503 are installed in only certain rooms and/or common areas of the building.

While FIG. 5 shows only one mobile device, each of the storage compartments 503 may communicate with a plurality of mobile devices.

The storage compartments 503 may be further configured such that the storage compartments 503 only communicate with registered mobile devices rather any mobile devices within the range of the communications protocol 515. A mobile device may be registered with the security system 500 or only with the storage compartments 503 through any means that enables the mobile device to receive information provided by the security system 500 or the storage compartments 503 and to transmit information from the mobile device to the security system 500 or the storage compartments 503. For example, a mobile device may be registered with the security system 500 or only with the storage compartments 503 by installing an application on the mobile device or by logging into a website of the security system 500 or the storage compartments 503 with a username and password supplied by the security system 500 or the storage compartment 503.

If a mobile device is registered via an application installed on the mobile device, the mobile device and the storage compartments may have either a direct communication (shown in FIG. 5) or an indirect communication. If a mobile device is registered via logging into a website, the mobile device and the storage compartments preferably have an indirect communication. In one embodiment, indirect communication may involve employing a server in the communication path between the storage compartments and the mobile device such that the storage compartments only communicate or always communicate with the server before communicating with the mobile device and that the mobile device only communicates or always communicate with the server before communicating with the storage compartments. For example, the information from the storage compartments 503 or the security system 500 are transmitted to the server and the user of the mobile device can view the information on the website he or she logged in or on the server since the website is associated with the server. If the user of the mobile device views the information on the installed application, the installed application may also allow the user to view the information on the website or allow the user to view the information on the mobile device that the server received from the storage compartments and transmitted to the mobile device. When the mobile device wants to communicate with the storage compartments, the information from the mobile device are transmitted to the server. The server may subsequently transmit the information to the storage compartments or the storage compartments may communicate with the server to retrieve the information. The communications protocol between the server and the storage compartments and the communications protocol between the server and the mobile device may be the same or different.

The mobile device may be any one of a smart phone, smart tablet or smart watch. The device may be carried or worn by the user so that it can be accessed during travel to or from the building or even when the user or person is in the building.

If the user of the mobile device is not an authorized person, the information provided by the security system 500 or the storage compartments 503 may not include the locations of the storage compartments 503. If the user of the mobile device is an authorized personnel, the information provided by the security system 500 or the storage compartments 503 may include the locations of the storage compartments 503.

The storage compartments 503 may be further configured such that each of the storage compartments 503 can detect which of the registered mobile devices are in the building or near the building within the range of the communications protocol 515 and track the movement of those registered mobile devices within the range of the communications protocol 515. As such, the storage compartment 503 can detect which registered mobile devices are leaving the building, which registered mobile devices are coming to the building, which registered mobile devices are in the building and their movement inside the building. All this information may be displayed on the screen of the storage compartment for viewing. In one embodiment, all the information may be available on the screen before and after any of the two activation mechanisms is activated. In another embodiment, all these information may be available on the screen only after either of the two activation mechanisms is activated, preferably only after the second activation mechanism is activated. When the second activation mechanism is activated by an authorized personnel to signal an emergency disturbance, the authorized personnel may immediately know who are in the building and who are near the building and provide assistance to those individuals since the registered mobile devices with the individuals. If the registered mobile devices are outside the range of the communications protocol 515 and cannot be detected, the screen of the storage compartment may not disclose any information of those devices since they are not within or close to the zone of emergency or may disclose that those devices are in a safe area. The storage compartments 503 may also be configured to similarly detect and track other electronic devices that have a Radio-Frequency Identification (RFID) tag in addition to registered mobile devices. Detecting and tracking registered mobile devices and electronic devices that have a RFID tag may be achieved through either direct or indirection communication.

The storage compartment would also be able to monitor people in a room if each person would wear or carry, for example, a card or badge that includes an id tag with a RF chip. This technology would be able to confirm who is in attendance and can tracking movement of such persons. This could indicate a problem in the building even without an alarm as the unexpected or improper movement of a group of persons might indicate some type of problem or issue in the building.

Another way to monitor the people in the room would be by their mobile device that would include an application that would enable such monitoring and tracking to occur.

Alternatively, the user of the smart phone, tablet or watch would be notified of disturbances in areas of compromise. This allow the user to have a watch with an application that would keep them in communication with all storage compartments that are set up in the building. In some embodiments, the storage compartments can be set up in other public areas. This would allow, for example, a child having a smart watch to receive information of disturbances or emergency situations and avoid those areas by directing him or her to a safe area, preferably one where a storage compartment is installed or where security personnel are located.

FIG. 5 shows that only the storage compartments 503 are configured to communicate with the mobile device 510. In some embodiments, however, each of the cameras 501 and each of the monitors 502 may also be similarly modified to communicate with the mobile device 510 if desired and the storage compartments 503 may or may not be configured to communicate with the mobile device 510.

While the above is a description of some particular embodiments of the invention, various alternatives, modifications, and equivalents may be used. When the systems and methods are used in other buildings or areas, the mobile device application would alert registered users of a disturbance taking place in the areas near or where they are registered. The user notification is typically generated by the storage compartment and the user awareness map grows as more storage boxes are installed in different places in those buildings or structures. The larger structures or those having numerous larger rooms, such as a shopping mall that includes large stores, could include multiple storage boxes in different locations in the room, so that in addition to being more convenient for security or authorized personnel to access the weapons stored therein, better internet connections to the mobile devices is provided. Therefore, the above description should not be taken as limiting the scope of the invention which is defined only by the appended claims.

What is claimed is:

1. A security system for identifying a disturbance in a room of a building, the system comprising:
a camera and monitor in a number of rooms of the building typically occupied by individuals, with the camera operatively configured to normally be inactive even when individuals are present in the room, with the camera positioned and located to record and transmit viewing of a substantial portion or all of the room when the camera is activated, with the camera able to record both sights and sounds occurring in the room only when activated by an authorized person who is present in the room, and with the monitor engageable to receive transmissions from one or more cameras of other occupied rooms only when the cameras in the other rooms are activated; and
a storage compartment for a weapon located in a plurality or all of the rooms, the storage compartment configured to communicate with a mobile device via a communications protocol and being in electronic association with at least two manual activation mechanisms, a first one associated with activation of the system for a non-emergency situation and a second one associated with activation of the system for an emergency situation, wherein each manual activation mechanism is located in the same room as the storage compartment;
wherein the storage compartment detects the mobile device and tracts movement of the mobile device within the range of the communications protocol;
wherein the first activation mechanism is manually activatable by an authorized individual in the room to indicate a non-emergency disturbance and, when engaged, activates the camera in the room so that events occurring in the room during the disturbance are recorded and notifies the building and user of the mobile device the non-emergency disturbance; and
wherein the second activation mechanism is manually activatable by the authorized individual in the room to indicate an emergency situation in the room and, when sequentially or simultaneously engaged after or when the first activation mechanism is engaged, activates the camera, opens the storage compartment to provide access to the weapon therein and generates an alarm that indicates that an emergency situation exists in the room to the building and the user of the mobile device, with the camera, only when activated by the second activation mechanism, allowing video and audio of the events in the room to be simultaneously recorded and transmitted to the monitors of at least adjacent or nearby rooms to provide the occupants of those rooms information regarding the emergency situation and to the user of the mobile device to provide the user information regarding the emergency situation.

2. The system according to claim 1, wherein each room of the building includes a camera, monitor, storage compartment and first and second activation mechanisms.

3. The system according to claim 1, wherein the first and second activation mechanisms are mounted on the storage compartment.

4. The system according to claim 1, wherein the first and second activation mechanisms are mounted on a wireless remote that is maintained in the room with the storage compartment.

5. The system according to claim 1, wherein the second activation mechanism is a button, keypad, finger print sensor, smart card sensor or acoustic sensor.

6. The system according to claim 5, wherein the acoustic sensor detects a gunshot, an explosion, a breaking window, or noise having a certain decibel level or frequency.

7. The system according to claim 1, further comprising a smoke or fire sensor associated with the storage compartment.

8. The system according to claim 1, wherein access to the second activation mechanism is provided after the first activation mechanism is activated.

9. The system according to claim 1, wherein the storage compartment comprises communication capabilities accessible after the first activation mechanism is activated.

10. The system according to claim 1, further comprising additional cameras located in hallways, stairs, elevators, or doors providing access to the building to view those areas and transmit video and audio of activities thereby.

11. The system according to claim 10, wherein the additional cameras are provided on a monitor that displays video and audio of the events occurring in the room where the disturbance is located.

12. The system according to claim 11, wherein the monitors further comprise a microphone for recording sounds near the monitor.

13. The system according to claim 10, wherein the additional cameras are activated when the second activation mechanism is activated.

14. The system according to claim 13, wherein the video and audio of the camera in the room in which the emergency situation exits and the video and audio of the additional cameras in the hallways, stairs, elevators, or doors providing access to the building are transmitted to a security office.

15. The system according to claim 14, wherein the security office is a principal's office, a school security office or a police station.

16. The system according to claim 1, wherein the second activation mechanism transmits information to lock down doors, stairwells or elevators nearby the room in which the emergency situation exits or in a section of the building nearby the room in which the emergency situation exits to contain the emergency situation.

17. The system according to claim 1, wherein the weapon is a handgun, stun gun, club or bat, tear gas or pepper spray, and the mobile device is a smart phone, smart tablet or smart watch.

18. The system according to claim 1, wherein the storage compartment is configured to communicate with a registered mobile device.

19. The system according to claim 1, wherein the registered mobile device is registered with the system via an application installed on the mobile device or a website associated with the system.

20. The system according to claim 1, wherein the communications protocol is WiFi, Bluetooth, 802.11, Bluetooth, radio frequency systems such as 900 MHz, 1.4 GHz, and 5.6 GHz communication systems, infrared, GSM, GSM plus EDGE, CDMA, quadband, and/or any other suitable protocol.

21. A method for operating the system according to claim 1, the method comprising:
  operatively configuring each camera and monitor in each room to normally be inactive; activating a camera to record both sights and sounds occurring in the room during the non-emergency disturbance when the first activation mechanism is manually activated by the authorized person but without simultaneously transmitting the recorded sights and sounds to other rooms;
  activating a camera to record both sights and sounds occurring in the room and to transmit the recorded sights and sounds to the adjacent or nearby rooms during the emergency situation when the second activation mechanism is manually activated by the authorized person;
  engaging the monitors in adjacent or nearby rooms to receive transmissions of the camera that is in the room experiencing the emergency situation to provide the occupants of the adjacent or nearby rooms with information regarding the emergency situation and the room in which the emergency situation is occurring;
  establishing communicating between the storage compartment and a mobile device carried by one or more persons in the room; and
  tracking movement of the mobile device within the range of the communications protocol.

22. The method according to claim 21, which further comprises opening the storage compartment after the second activation mechanism is manually activated to provide access to the weapon therein while also generating an alarm that indicates that the emergency situation exists in the room.

* * * * *